United States Patent
Suzuki

(10) Patent No.: US 8,708,428 B2
(45) Date of Patent: Apr. 29, 2014

(54) PUMP CONTROL APPARATUS AND BRAKE CONTROL SYSTEM

(75) Inventor: Masakuni Suzuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 913 days.

(21) Appl. No.: 12/671,440

(22) PCT Filed: Jul. 29, 2008

(86) PCT No.: PCT/IB2008/001973
§ 371 (c)(1),
(2), (4) Date: Jan. 29, 2010

(87) PCT Pub. No.: WO2009/016468
PCT Pub. Date: Feb. 5, 2009

(65) Prior Publication Data
US 2010/0187899 A1  Jul. 29, 2010

(30) Foreign Application Priority Data
Jul. 30, 2007  (JP) ................................. 2007-198134

(51) Int. Cl.
*B60T 13/74*  (2006.01)
(52) U.S. Cl.
USPC ............................................... 303/3; 417/22
(58) Field of Classification Search
USPC .......... 303/3; 417/22, 32, 44.1; 318/471–473, 318/479, 504, 459, 442
See application file for complete search history.

(56) References Cited

U.S. PATENT DOCUMENTS

| | | | |
|---|---|---|---|
| 4,567,413 A * | 1/1986 | Yabe et al. | 318/489 |
| 4,827,897 A | 5/1989 | Yamada et al. | |
| 5,704,766 A | 1/1998 | Fennel et al. | |
| 6,121,746 A * | 9/2000 | Fisher et al. | 318/772 |
| 6,206,489 B1 | 3/2001 | Schmidt et al. | |
| 7,042,180 B2 * | 5/2006 | Terry et al. | 318/400.21 |
| 7,583,041 B2 * | 9/2009 | Yamaguchi et al. | 318/471 |
| 2005/0069418 A1 * | 3/2005 | Kokubo | 417/44.1 |

FOREIGN PATENT DOCUMENTS

| | | |
|---|---|---|
| DE | 42 32 130 | 3/1994 |
| DE | 44 08 879 | 9/1995 |
| DE | 196 24 492 A1 | 1/1997 |

(Continued)

OTHER PUBLICATIONS

Maching translation of JP 2005-198478.*

(Continued)

*Primary Examiner* — Robert A Siconolfi
*Assistant Examiner* — Mahbubur Rashid
(74) *Attorney, Agent, or Firm* — Oblon, Spivak, McClelland, Maier & Neustadt, L.L.P.

(57) ABSTRACT

In a pump control apparatus that controls the discharge of brake fluid using the rotation of a motor, the number of windings in a low speed circuit is set such that the motor operates at a second rotation speed when the low speed circuit is connected to a power supply. A high speed circuit shares a portion of the windings of the low speed circuit so that the motor operates at a first rotation speed when a power supply voltage is supplied to an input terminal which is disposed midway in the windings of the low speed circuit. An ECU determines the load state of the motor based on a difference between the output voltage at an output terminal and the power supply voltage.

15 Claims, 10 Drawing Sheets

(56) References Cited

FOREIGN PATENT DOCUMENTS

| | | |
|---|---|---|
| DE | 100 42 378 | 10/2001 |
| DE | 103 28 806 | 5/2004 |
| EP | 0 937 618 | 8/1999 |
| EP | 1 004 493 | 5/2000 |
| JP | 9-2232 | 1/1997 |
| JP | 2004-242425 | 8/2004 |
| JP | 2005 96613 | 4/2005 |
| JP | 2005-198478 | 7/2005 |
| WO | 84 00450 | 2/1984 |

OTHER PUBLICATIONS

Office Action issued Aug. 8, 2012 in German Patent Application No. 11 2008 002 061.2 (with English-language translation).

* cited by examiner

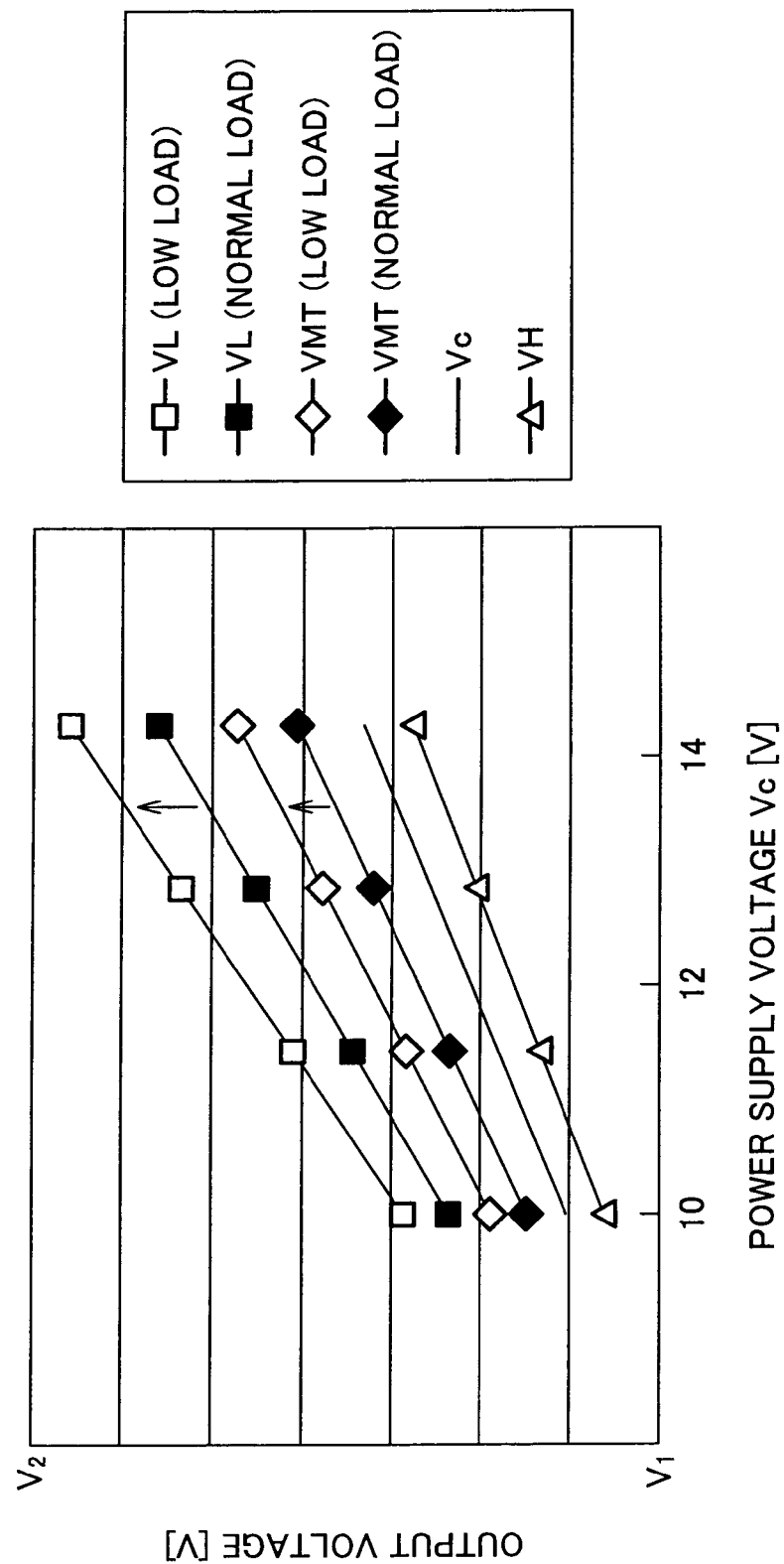

PUMP CONTROL APPARATUS AND BRAKE CONTROL SYSTEM

BACKGROUND OF THE INVENTION

1. Field of the Invention

The invention relates to a pump control apparatus that drives a pump using a motor.

2. Description of the Related Art

Some known brake control systems control the braking force of a vehicle by generating hydraulic pressure in a hydraulic circuit according to the operating force applied to a brake pedal and supplying that hydraulic pressure in the hydraulic circuit to a wheel cylinder. One such brake control system brakes a vehicle by supplying hydraulic pressure, which is different than a master cylinder pressure, from an accumulator serving as a hydraulic pressure source to the wheel cylinder. This kind of a system controls the hydraulic pressure by detecting the operating amount of the brake pedal by the driver and supplying brake fluid from the accumulator to match the wheel cylinder pressure corresponding to the operating amount.

Accumulation in the accumulator is achieved by driving a pump. However, if the amount of brake fluid in the hydraulic circuit falls below a specified amount, brake fluid cannot be discharged normally from the pump. As a result, sufficient accumulation in the accumulator is not possible so brake fluid is unable to be appropriately supplied from the accumulator to the wheel cylinder, making high-precision braking difficult. Therefore, if such a state is detected in the brake control system, various control valves are controlled to close off the flow path from the accumulator to the wheel cylinder and supply brake fluid to the wheel cylinder from another flow path. The various methods for detecting a decrease in brake fluid have been proposed, such as monitoring the level of brake fluid in a reservoir tank.

The current supplied to a motor for driving the pump changes depending on the load. Therefore, Japanese Patent Application Publication No. 2005-96613 (JP-A-2005-96613) describes a pump-driving motor control apparatus that estimates the pump load by monitoring a change in the output voltage between the motor for driving the pump and the power supply.

However, with the control apparatus described in JP-A-2005-96613, the output voltage is always lower than the power supply voltage so the difference in the output voltage when the pump load is high versus when the pump load is low is not that great, which limits the estimation accuracy of the pump load.

SUMMARY OF THE INVENTION

This invention thus provides technology for more accurately estimating the pump load.

A first aspect of the invention relates to a pump control apparatus which controls the discharge of brake fluid using the rotation of a motor. This pump control apparatus includes a motor main body having a rotating shaft that drives a pump; a high speed circuit configured to operate the motor at a first rotation speed when the high speed circuit is connected to a power supply; a low speed circuit configured to operate the motor at a second rotation speed which is slower than the first rotation speed when the low speed circuit is connected to the power supply while a voltage in the low speed circuit becomes higher than a power supply voltage when the power supply is connected to the high speed circuit; an output terminal which is connected to a first branch point via a first resistor, the first branch point being disposed between the motor main body and the power supply in the low speed circuit; and determining means for determining a load state of the motor based on an output voltage at the output terminal.

With a typical motor in which the operating speed (i.e., the rotation speed) is constant, the output voltage between the power supply and a rotating circuit that includes a winding such as a coil becomes lower than the power supply voltage. However, according to the aspect described above, the low speed circuit is configured such that the voltage in the low speed circuit becomes higher than the power supply voltage when the power supply is connected to the high speed circuit. As a result, the output voltage at the output terminal becomes higher than the power supply voltage when the load on the motor is normal. Therefore, the output voltage at the output terminal changes significantly compared with a typical motor when there is a change in the current flowing to the circuit resulting from a difference in the load on the motor that drives the pump, which is due to a change in the pump load caused by the amount of brake fluid or the environment. As a result, the pump load can be more accurately estimated by the change in the output voltage at the output terminal.

The number of windings in the low speed circuit may be set such that the motor operates at the second rotation speed when the low speed circuit is connected to the power supply. Also, the high speed circuit may be configured to share a portion of the windings of the low speed circuit so that the motor operates at the first rotation speed when the power supply voltage is input to an input terminal which is disposed midway in the windings of the low speed circuit. Accordingly, the low speed circuit and the high speed circuit share the windings, which enables the circuit configuration to be simplified. Also, when the power supply voltage is supplied to the input terminal of the high speed circuit which has fewer windings, voltage that is higher than the power supply voltage is generated in the end portion of the winding of the low speed circuit that is not shared, due to induced electromotive force. As a result, when the power supply is connected to the high speed circuit, the low speed circuit is able to generate higher voltage than the power supply voltage at the output terminal. Incidentally, portions of these circuits other than the windings may also be shared. Also, condensers, coils, and resistors for reducing noise may also be incorporated into the circuits as appropriate.

The determining means may determine the load state of the motor based on a difference between output voltage at the output terminal and the voltage of the power supply.

The determining means may determine that the load state of the motor is decreased when the difference between the output voltage at the output terminal and the power supply voltage is greater than a first threshold value.

The determining means may determine the load state of the motor based on the difference between the output voltage at the output terminal and another output voltage at the output terminal during normal operation when the load on the motor is normal. As a result, the load state of the motor can be determined while minimizing the effects from changes over time and individual differences in the motor.

The determining means may determine that the load state of the motor is decreased when the difference between the output voltage at the output terminal and another output voltage at the output terminal during normal operation when the load on the motor is normal is greater than a second threshold value.

The pump control apparatus may also include temperature information detecting means for detecting temperature information that causes a change in the output voltage at the output terminal. Also, the determining means may determine the load state of the motor using the output voltage at the output terminal which has been corrected based on the detected temperature information. Accordingly, the load state of the motor can be accurately determined even if the environment in which the motor is being used changes. Here, the temperature information that causes a change in the output voltage at the output terminal may be, for example, the temperature of the motor itself, the environmental temperature in which the motor is used, or the temperature of the brake fluid at which the motor load fluctuates due to a change in the viscosity due to the temperature, or the like.

The output terminal may be connected to a second branch point via a second resistor, the first branch point being disposed between the motor main body and the power supply in the high speed circuit.

A value of the first resistor arranged between the output terminal and the low speed circuit may be lower than that of the second resistor arranged between the output terminal and the high speed circuit. Accordingly, the first resistor arranged between the output terminal and the low speed circuit enables the voltage output from the output terminal to be higher than the second resistor arranged between the output terminal and the high speed circuit does.

A second aspect of the invention relates to a brake control system that includes a reservoir which stores brake fluid; a manual hydraulic pressure source that pressurizes the stored brake fluid according to an operating amount of a brake operating member by a driver; a power hydraulic pressure source capable of accumulating pressure using power independent of a brake operation by the driver; a first wheel cylinder which receives brake fluid from at least one of the manual hydraulic pressure source and the power hydraulic pressure source, and applies braking force to a wheel; a second wheel cylinder which receives brake fluid from the power hydraulic pressure source, and applies braking force to the wheel; a manual pressure transmitting path which connects the manual hydraulic pressure source with the first wheel cylinder so as to enable brake fluid to be supplied from the manual hydraulic pressure source to the first wheel cylinder; a power hydraulic pressure transmitting path which connects the power hydraulic pressure source with the first wheel cylinder and the second wheel cylinder so as to enable brake fluid to be supplied from the power hydraulic pressure source to the first wheel cylinder and the second wheel cylinder; a first control valve which is provided in the power hydraulic pressure transmitting path and controls the supply of brake fluid from the power hydraulic pressure source to the first wheel cylinder; a second control valve which is provided in the power hydraulic pressure transmitting path and controls the supply of brake fluid from the power hydraulic pressure source to the second wheel cylinder; and valve controlling means for controlling the first control valve and the second control valve in order to control the pressure of the brake fluid in the power hydraulic pressure transmitting path. The power hydraulic pressure source includes a pump that is driven by a motor, an accumulator in which pressure is accumulated by filler gas being compressed by the brake fluid supplied from the pump, and a pump control apparatus that controls the discharge of brake fluid using the rotation of the motor. The pump control apparatus includes a motor main body having a rotating shaft that drives the pump; a high speed circuit configured to operate the motor at a first rotation speed when the high speed circuit is connected to a power supply; a low speed circuit configured to operate the motor at a second rotation speed which is slower than the first rotation speed when the low speed circuit is connected to the power supply while a voltage in the low speed circuit becomes higher than a power supply voltage when the power supply is connected to the high speed circuit; an output terminal which is connected to a first branch point via a first resistor, the first branch point being disposed between the motor main body and the power supply in the low speed circuit; and determining means for determining a load state of the motor based on an output voltage at the output terminal. The determining means estimates the remaining amount of brake fluid between the reservoir and the pump from the determined load state of the motor.

According to this second aspect, it is possible to accurately estimate the remaining amount of brake fluid by estimating the load on the oil pump that changes according to the remaining amount of brake fluid by using the output voltage of the output terminal that is connected to the low speed circuit of the motor of the pump control apparatus. As a result, when the remaining amount of brake fluid is decreased, brake fluid can be replenished or a warning indicating that the remaining amount of brake fluid is low can be output at an appropriate timing.

The valve controlling means may close the first control valve to interrupt the supply of brake fluid from the accumulator to the first wheel cylinder when the remaining amount of brake fluid estimated by the determining means is equal to or less than a predetermined value. Accordingly, if there is a request to brake when the remaining amount of brake fluid is equal to or less than the predetermined value, the brake control system is able to apply sufficient braking force to the second wheel cylinder, even if the amount of brake fluid is small, by interrupting the supply of brake fluid from the power hydraulic pressure source to the first wheel cylinder. At this time, the brake control system can supply brake fluid from the manual hydraulic pressure source to the first wheel cylinder so the necessary braking force can be generated in both the first wheel cylinder and the second wheel cylinder.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is a graph showing the relationship among the power supply voltage of various values and the output voltage at those times;

DETAILED DESCRIPTION OF THE EMBODIMENTS

Hereinafter, example embodiments of the invention will be described in detail with reference to the accompanying drawings.

First, a brake control system that suitably employs a pump control apparatus according to a first example embodiment of the invention will be described.

Figure 1:
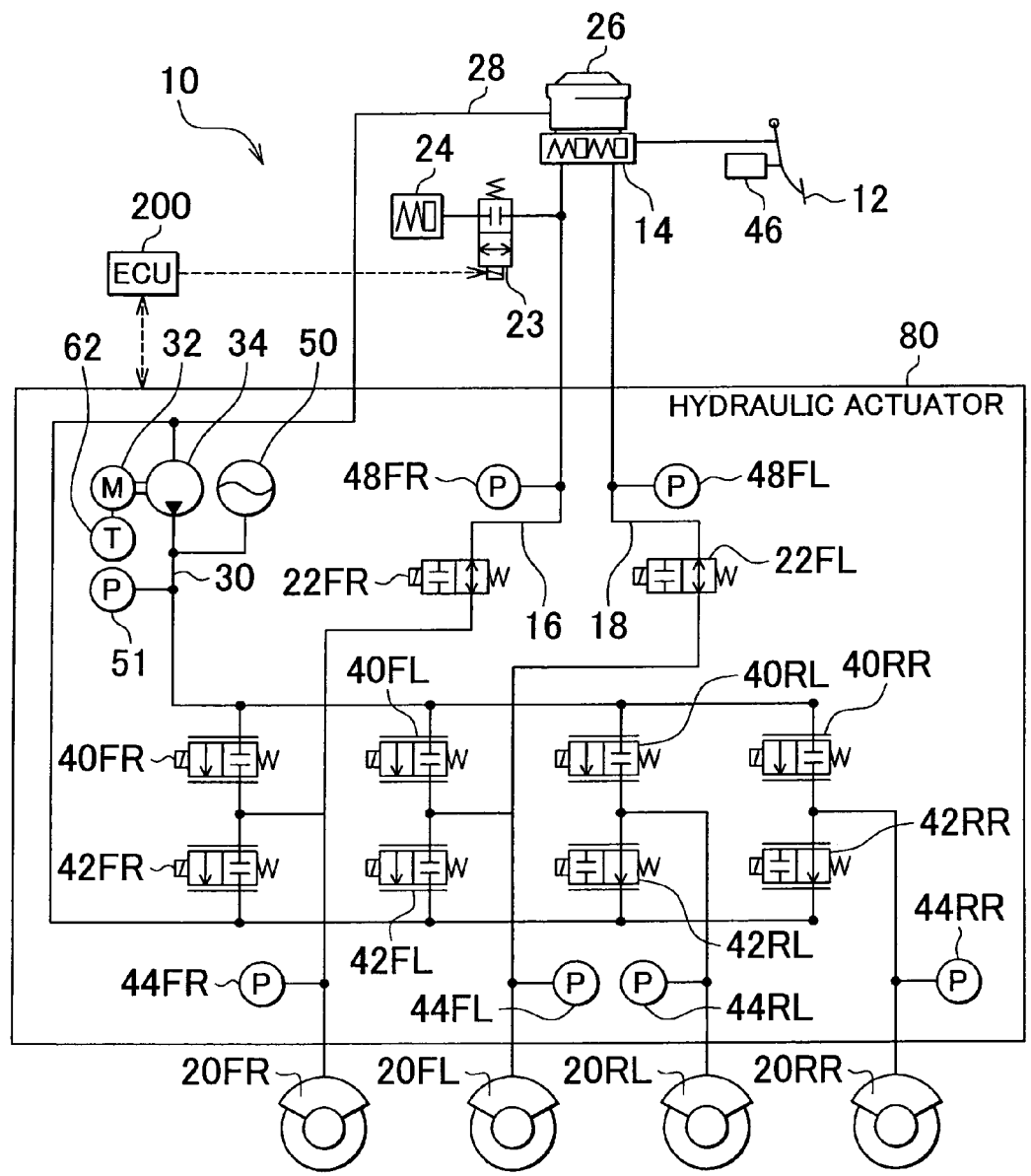
FIG. 1 is a system diagram of a brake control system according to a first example embodiment of the invention.

FIG. 1 is a system diagram of a brake control system 10 according to the first example embodiment. The brake control system 10 shown in FIG. 1 is an electronically controlled brake system for a vehicle, which independently and optimally sets the braking force applied to each of four wheels of a vehicle in response to an operation of a brake pedal 12, which serves as a brake operating member, by a driver. That is, the brake control system 10 is able to control the braking force that is applied to the wheels of the vehicle.

The brake pedal 12 is connected to a master cylinder 14 that discharges brake fluid, i.e., hydraulic fluid, according to a depression operation performed by the driver. Also, a stroke sensor 46 that detects the depression stroke is provided with the brake pedal 12.

A reservoir tank 26 is connected to the master cylinder 14. One outlet port of the master cylinder 14 is connected via a switching valve 23 to a stroke simulator 24 that generates reaction force corresponding to the operating force with which the brake pedal 12 is depressed by the driver. Incidentally, the switching valve 23 is a normally closed electromagnetic valve which is closed when de-energized and opens when operation of the brake pedal 12 by the driver is detected.

A right front wheel brake pressure control line 16 is connected at one end to one output port of the master cylinder 14, and at the other end to a right front-wheel wheel cylinder 20FR that applies braking force to a right front wheel, not shown. Similarly, a left front wheel brake pressure control line 18 is connected at one end to the other output port of the master cylinder 14, and at the other end to a left front-wheel wheel cylinder 20FL that applies braking force to a left front wheel, not shown.

A right electromagnetic switching valve 22FR is provided midway in the right front wheel brake pressure control line 16, and a left electromagnetic switching valve 22FL is provided midway in the left front wheel brake pressure control line 18. The right electromagnetic switching valve 22FR and the left electromagnetic switching valve 22FL are both normally open electromagnetic valves which are open when de-energized and close when operation of the brake pedal 12 by the driver is detected.

Further, a right master pressure sensor 48FR that detects the master cylinder pressure on the right front wheel side is provided midway in the right front wheel brake pressure control line 16. Similarly, a left master pressure sensor 48FL that detects the master cylinder pressure on the left front wheel side is provided midway in the left front wheel brake pressure control line 18.

With the brake control system 10, when the driver depresses the brake pedal 12, the depression amount is detected by the stroke sensor 46. However, the force with which the brake pedal 12 is depressed (i.e., the depression force) can also be obtained from the master cylinder pressure detected by the right master pressure sensor 48FR and the left master pressure sensor 48FL. In this way, supposing that the stroke sensor 46 were to fail, it is preferable from the viewpoint of a failsafe to monitor the master cylinder pressure using both the right master pressure sensor 48FR and the left master pressure sensor 48FL.

One end of a hydraulic pressure supply and discharge line 28 is connected to the reservoir tank 26. The other end of this hydraulic pressure supply and discharge line 28 is connected to an inlet of an oil pump 34 which is driven by a motor 32. An outlet of the oil pump 34 is connected to a high pressure line 30. An accumulator 50 is also connected to this high pressure line 30. In this first example embodiment, the oil pump 34 is a reciprocating pump which has at least two pistons, not shown, that are driven in a reciprocating fashion by the motor 32. Incidentally, the oil pump 34 is not limited to a reciprocating pump as long as it can discharge brake fluid using the rotation of the motor. Also, the accumulator 50 in this example embodiment is an accumulator that converts the pressure energy of the brake fluid into pressure energy of a filler gas such as nitrogen and stores it.

The accumulator 50 stores brake fluid that has been pressurized to approximately 14 to 22 MPa, for example, by the oil pump 34. Further, an accumulator pressure sensor 51 that detects the outlet pressure of the accumulator 50, i.e., the pressure of the brake fluid in the accumulator 50, is provided in the high pressure line 30. Also, a temperature sensor 62 that detects the temperature of the motor 32 or the use environmental temperature is also provided.

The high pressure line 30 is connected to a right front-wheel wheel cylinder 20FR via a pressure increase valve 40FR, a left front-wheel wheel cylinder 20FL via a pressure increase valve 40FL, a right rear-wheel wheel cylinder 20RR via a pressure increase valve 40RR, and a left rear-wheel wheel cylinder 20RL via a pressure increase valve 40RL. The pressure increase valves 40FR to 40RL are all normally closed electromagnetic flowrate control valves (linear valves) which are closed when de-energized and used to increase the pressure in the wheel cylinders 20FR to 20RL as necessary.

Incidentally, a disc brake unit is provided for each wheel of the vehicle, not shown. Each of these disc brake units generates braking force by pressing a brake pad against a disc through operation of the corresponding wheel cylinder 20FR to 20RL.

Also, the right front-wheel wheel cylinder 20FR is connected to the hydraulic pressure supply and discharge line 28 via a pressure decrease valve 42FR, and the left front-wheel wheel cylinder 20FL is connected to the hydraulic pressure supply and discharge line 28 via a pressure decrease valve 42FL. The pressure decrease valves 42FR and 42FL are both normally closed electromagnetic flowrate control valves (linear valves) used to decrease the pressure in the wheel cylinders 20FR and 20FL as necessary. Similarly, the right rear-wheel wheel cylinder 20RR is connected to the hydraulic pressure supply and discharge line 28 via a pressure decrease valve 42RR, and the left rear-wheel wheel cylinder 20RL is connected to the hydraulic pressure supply and discharge line 28 via a pressure decrease valve 42RL. The pressure decrease valves 42RR and 42RL are both normally open electromagnetic flowrate control valves.

Also, as shown in FIG. 1, the brake control system 10 according to this example embodiment also includes wheel cylinder pressure sensors provided for detecting the wheel cylinder pressure, which is the brake fluid pressure acting on the wheel cylinders. That is, a right front-wheel wheel cylinder pressure sensor 44FR is provided near the right front-wheel wheel cylinder 20FR and controls the brake fluid pressure acting on that wheel cylinder 20FR, a left front-wheel wheel cylinder pressure sensor 44FL is provided near the left front-wheel wheel cylinder 20FL and controls the brake fluid pressure acting on that wheel cylinder 20FL, a right rear-wheel wheel cylinder pressure sensor 44RR is provided near the right rear-wheel wheel cylinder 20RR and controls the brake fluid pressure acting on that wheel cylinder 20RR, and a left rear-wheel wheel cylinder pressure sensor 44RL is provided near the left rear-wheel wheel cylinder 20RL and controls the brake fluid pressure acting on that wheel cylinder 20RL. These wheel cylinder pressure sensors 44FR to 44RL function as pressure detecting means for detecting a brake fluid pressure that is applied to the wheel cylinders 20FR to 20RL, respectively.

The right electromagnetic switching valve 22FR, the left electromagnetic switching valve 22FL, the pressure increase valves 40FR to 40RL, the pressure decrease valves 42FR to 42RL, the oil pump 34, the accumulator 50 and the like together make up a hydraulic pressure actuator 80 of the brake control system 10. This hydraulic pressure actuator 80 is controlled by an electronic control unit (hereinafter simply referred to as "ECU") 200 which includes a CPU that executes various operations, ROM in which various control programs are stored, RAM which is used to store data and as a work area for executing programs, an input/output interface, and memory and the like.

Figure 2:
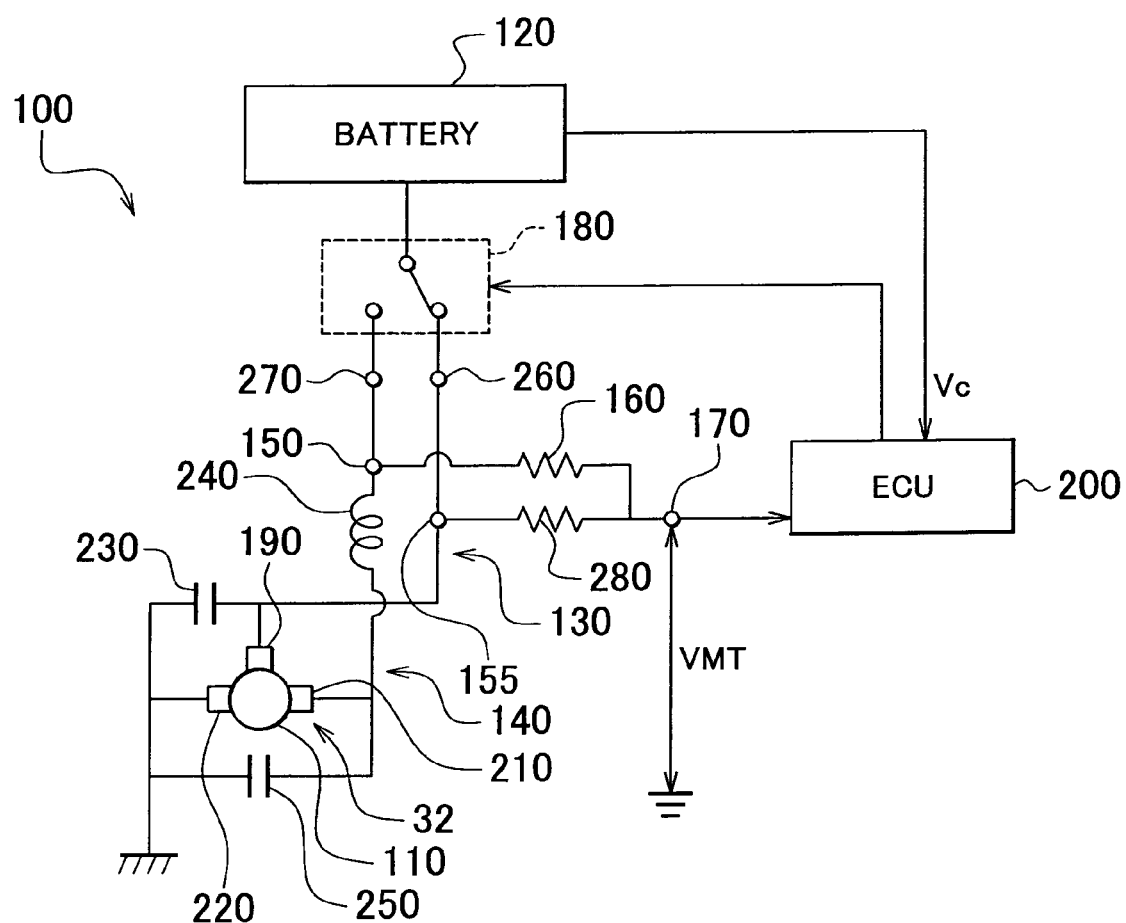
FIG. 2 is a diagram schematically showing the configuration of a pump control apparatus.

Next, a pump control apparatus that controls the discharge of brake fluid in the oil pump 34 described above using the rotation of the motor 32 will be described. FIG. 2 is a diagram schematically showing the configuration of this pump control apparatus.

The pump control apparatus 100 includes a motor main body 110, a high speed circuit 130, a low speed circuit 140, an output terminal 170, and an ECU 200. The motor main body 110 has a rotating shaft that drives the oil pump 34. The high speed circuit 130 is configured to rotate the motor 32 at a first rotation speed when connected to a battery 120 that generates a power supply voltage. The low speed circuit 140 is configured to rotate the motor 32 at a second rotation speed that is slower than the first rotation speed when connected to the battery 120, and increase the voltage so that it is higher than the voltage of the battery 120 when the high speed circuit 130 is connected to the battery 120. The output terminal 170 is connected to a branch point 150 via a resistor 160, which the branch point 150 is disposed between the motor main body 110 and the battery 120 in the low speed circuit 140. The ECU 200 determines the load state of the motor 32 based on the output voltage at the output terminal 170.

The motor main body 110 includes two positive electrode terminals 190 and 210 provided so that the rotation speed can be changed, and a common negative electrode terminal 220 that is connected to a vehicle body earth. The high speed circuit 130 has a coil (i.e., winding) that is wound a predetermined number of times between the positive electrode terminal 190 and the negative electrode terminal 220. Also, the high speed circuit 130 according to this example embodiment is connected to a condenser 230 between the positive electrode terminal 190 and the negative electrode terminal 220 in order to minimize noise. The output terminal 170 is connected via a resistor 280 to a branch point 155 in the high speed circuit 130 between the motor main body 110 and the battery 120.

The low speed circuit 140 has a coil that is wound a predetermined number of times between the positive electrode terminal 210 and the negative electrode terminal 220. Also, the low speed circuit 140 according to this example embodiment is connected to a condenser 250 between the positive electrode terminal 210 and the negative electrode terminal 220, as well as to a coil 240 between the battery 120 and the positive electrode terminal 210 in order to minimize noise.

The ECU 200 controls the supply of current to the motor 32 by controlling the connective state between the high speed circuit 130 or the low speed circuit 140 and the battery 120 by switching a switch 180 as necessary based on signals from the stroke sensor 46 and the other various pressure sensors shown in FIG. 1. Accordingly, the oil pump 34 is driven such that brake fluid is fed to the accumulator 50 where it is accumulated.

Figure 3:
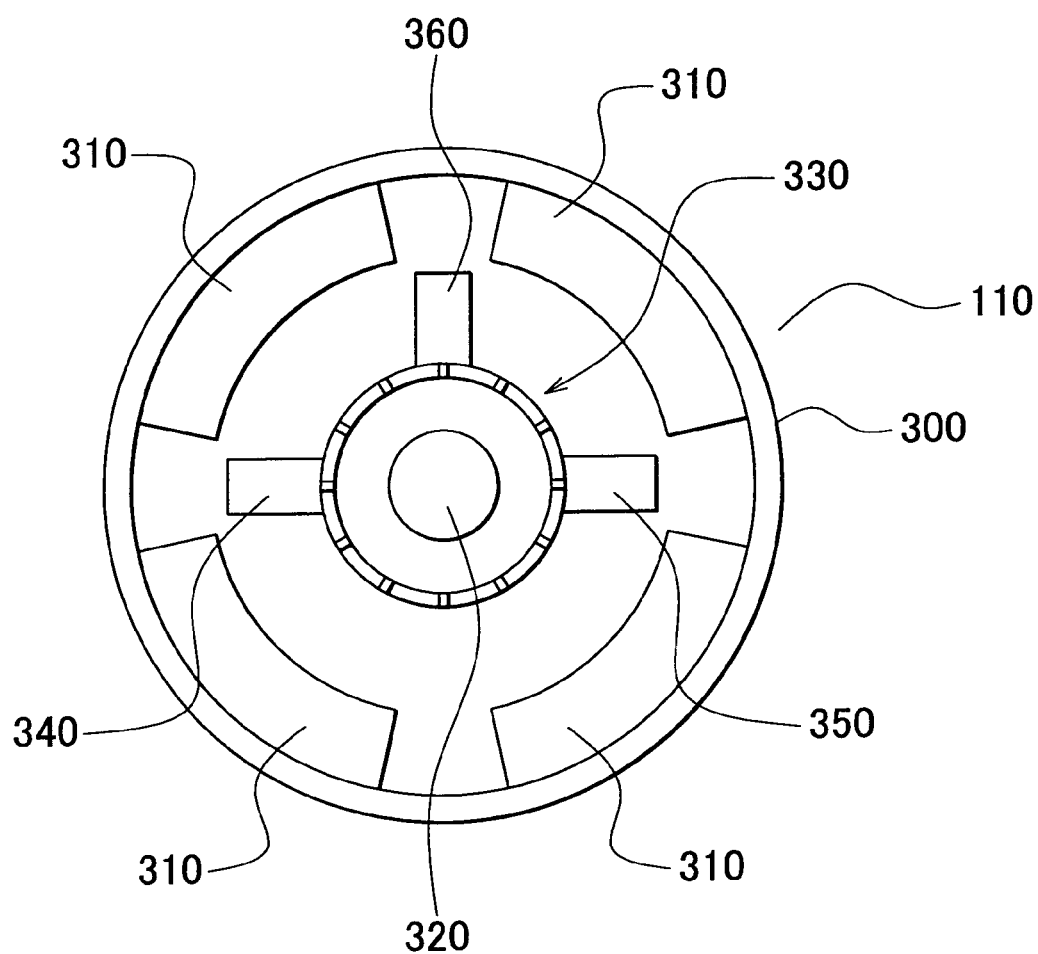
FIG. 3 is a sectional view schematically showing the internal structure of a motor.

Next, the motor according to this example embodiment will be described in more, detail. FIG. 3 is a sectional view schematically showing the internal structure of the motor. The motor main body 110 has a plurality of magnets 310 fixed to the inner peripheral surface of a housing 300. A rotor, not shown, having a coil is arranged on the inner peripheral side of the magnets 310, and a commutator 330 is fixed to an end portion of a rotor 320 of that rotor so as to face a plurality of brushes.

The motor main body 110 according to this example embodiment includes a common brush 340 that is connected to the negative electrode terminal 220, a high speed brush 350 that is connected to the positive electrode terminal 190 of the high speed circuit 130, and a low speed brush 360 that is connected to the positive electrode terminal 210 of the low speed circuit 140, so that the rotation speed can be switched.

Figure 4A:
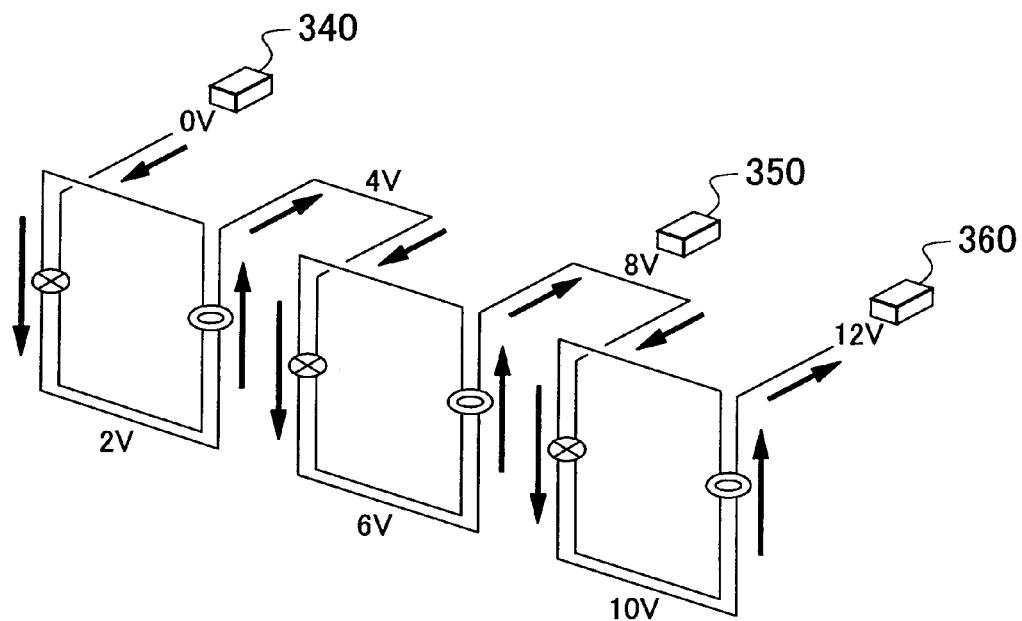
FIG. 4A is a view showing a frame format of voltage generated in brushes when current is applied to a low speed circuit.
Figure 4B:
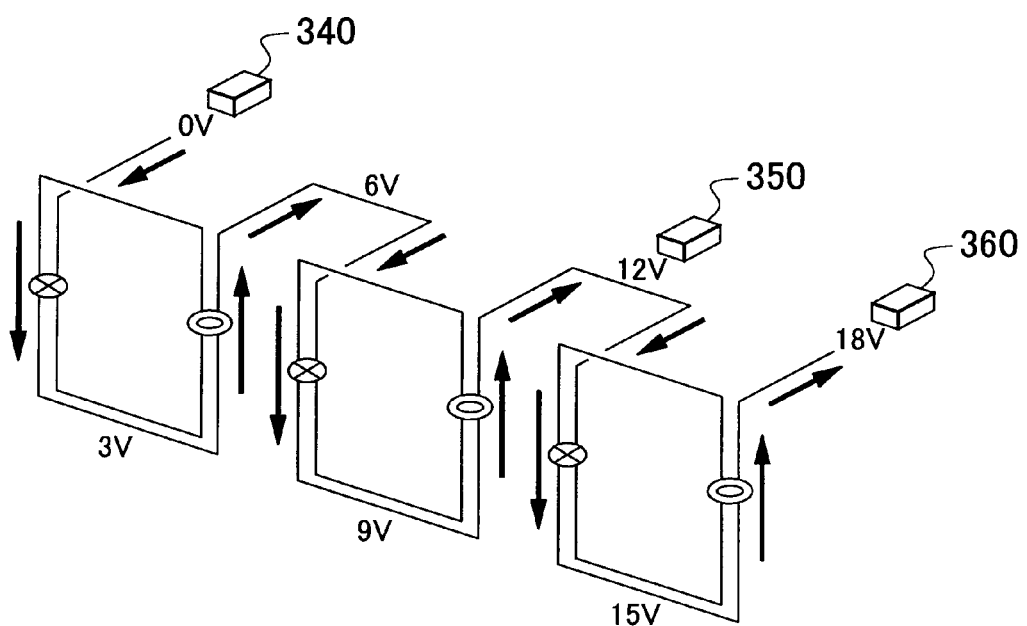
FIG. 4B is a view showing a frame format of voltage generated in brushes when current is applied to a high speed circuit.

Next, the voltage generated in the terminals when the motor load is normal in the motor 32, which is structured so as to be able to switch rotation speeds as described above, will be described. FIG. 4A is a view showing a frame format of voltage generated in the brushes when current is applied to the low speed circuit 140, and FIG. 4B is a view showing a frame format of voltage generated in the brushes when current is applied to the high speed circuit 130. Incidentally, in FIGS. 4A and 4B, the coil that is circularly-arranged between the brushes is shown here arranged in straight lines to facilitate understanding.

As shown in FIG. 4A, the high speed brush 350 is arranged between the common brush 340 and the low speed brush 360. As a result, the voltage generated in the high speed brush 350 by induced electromotive force when current is supplied to the low speed circuit 140 is a value between the voltage of the common brush 340 and the voltage of the low speed brush 360.

In the low speed circuit 140, the number of coil windings is set such that the motor 32 rotates at the second rotation speed which is relatively slow when the low speed circuit 140 is connected to the battery 120. The high speed circuit 130 shares a portion of the coil of the low speed circuit 140 so that the motor 32 rotates at the first rotation speed which is relatively fast when the voltage of the battery 120 is supplied to the high speed brush 350 being disposed midway in the coil of the low speed circuit 140.

More specifically, the ratio of the number of coil windings between the common brush 340 and the low speed brush 360 to the number of coil windings between the common brush 340 and the high speed brush 350 is 3:2. Therefore, for example, when a power supply voltage of 12 volts is applied to the low speed circuit 140 and current flows through that circuit, a voltage of 8 volts is generated in the high speed brush 350.

Meanwhile, as shown in FIG. 4B, voltage generated in the low speed brush 360 by induced electromotive force when current is supplied to the high speed circuit 130 is larger than the value of the voltage in the high speed brush 350. For example, when a power supply voltage of 12 volts is applied to the high speed circuit 130 and current flows through that circuit, a voltage of 18 volts is generated in the low speed brush 360. In this way, the low speed circuit 140 according to this example embodiment is configured such that the voltage becomes higher than the output voltage of the battery 120 when the high speed circuit 130 and the battery 120 are connected together and the motor load is normal.

Also, in the pump control apparatus 100 according to this example embodiment, the low speed circuit 140 and the high speed circuit 130 share a coil, which simplifies the circuit configuration. Also, when the voltage of the battery 120 is supplied to the positive electrode terminal 190 of the high speed circuit 130 which has fewer coil windings, a voltage that is higher than the voltage of the battery 120 is generated in the end portion of the coil of the low speed circuit 140 that is not shared, due to inducted electromotive force. As a result, when the high speed circuit 130 is connected to the battery 120, the low speed circuit 140 can generate voltage in the output terminal 170 which is higher than the voltage of the battery 120. That is, when the load of the motor 32 is normal, the output voltage VMT at the output terminal 170 (see FIG. 2) can be increased so that it is higher than the power supply voltage Vc of the battery 120.

Next, the relationship among i) the output voltage VMT of the output terminal 170, ii) the output voltage VH at a high speed terminal 260 (see FIG. 2) in the high speed circuit 130, and iii) the output voltage VL at a low speed terminal 270 (see FIG. 2) in the low speed circuit 140, when the power supply voltage Vc is applied to the high speed circuit 130 while the motor load is normal, will be described in detail. FIG. 5 is a graph showing the relationship among the power supply voltage Vc of various values and the output voltages VMT, VH, and VL at those times.

As shown in the graph in FIG. 5, the output voltage VH at the high speed terminal 260 is a slightly lower value than the power supply voltage Vc due to the impedance of the circuit. On the other hand, the output voltage VL at the low speed terminal 270 is a higher value than the power supply voltage Vc for the reason explained with reference to FIG. 4B. The output terminal 170 according to this example embodiment is connected to the low speed circuit 140 via the resistor 160, and is also connected to the high speed circuit 130 via the resistor 280. The output voltage VMT of the output terminal 170 equals the sum of VH and VL divided by two (i.e., VMT=(VH+VL)/2) when the resistance values of the resistors 160 and 280 are the same, for example.

A method for determining the motor load, i.e., the discharge state of the oil pump 34, using the pump control apparatus 100 provided with the output terminal 170 will now be described. In the brake control system 10 shown in FIG. 1, the amount of brake fluid may gradually decrease due to volatilization and extended use. In this case, when the level of the brake fluid drops to a level near the oil pump 34, the discharge state of the brake fluid when the oil pump 34 is being driven becomes unstable. That is, if there is an appropriate amount of brake fluid, that brake fluid can be stably discharged when a constant load is applied to the oil pump 34, such that brake fluid can be fed to the accumulator. If, on the other hand, the amount of brake fluid decreases and the level drops, the load on the oil pump 34 will decrease, so the load on the motor 32 will also decrease.

When the load decreases in this way, the rotation speed of the motor 32 increases even though the current flowing through the motor 32 when the power supply voltage Vc is applied decreases. Therefore, the output voltage VL at the low speed terminal 270 becomes larger than it is when the normal load is applied. In particular, in the pump control apparatus 100 according to this example embodiment, the output voltage VMT of the output terminal 170 when the normal load is applied is higher than the power supply voltage Vc. Therefore, the output voltage VMT at the output terminal 170 changes significantly compared with a typical motor when there is a change in the current flowing to the high speed circuit 130 and a change in the rotation speed of the motor 32 which drives the oil pump 34 resulting from a difference in the load on the motor 32, which is due to a change in the pump load caused by the amount of brake fluid or the environment. As a result, the pump load can be more accurately estimated by the change in the output voltage VMT at the output terminal 170.

Incidentally, a value of the resistor 160 arranged between the output terminal 170 and the low speed circuit 140 may be lower than that of the resistor 280 arranged between the output terminal 170 and the high speed circuit 130. Accordingly, the resistor 160 arranged between the output terminal 170 and the low speed circuit 140 enables the voltage VMT output from the output terminal 170 to be higher than the resistor 280 arranged between the output terminal 170 and the high speed circuit 130 does.

Figure 6:
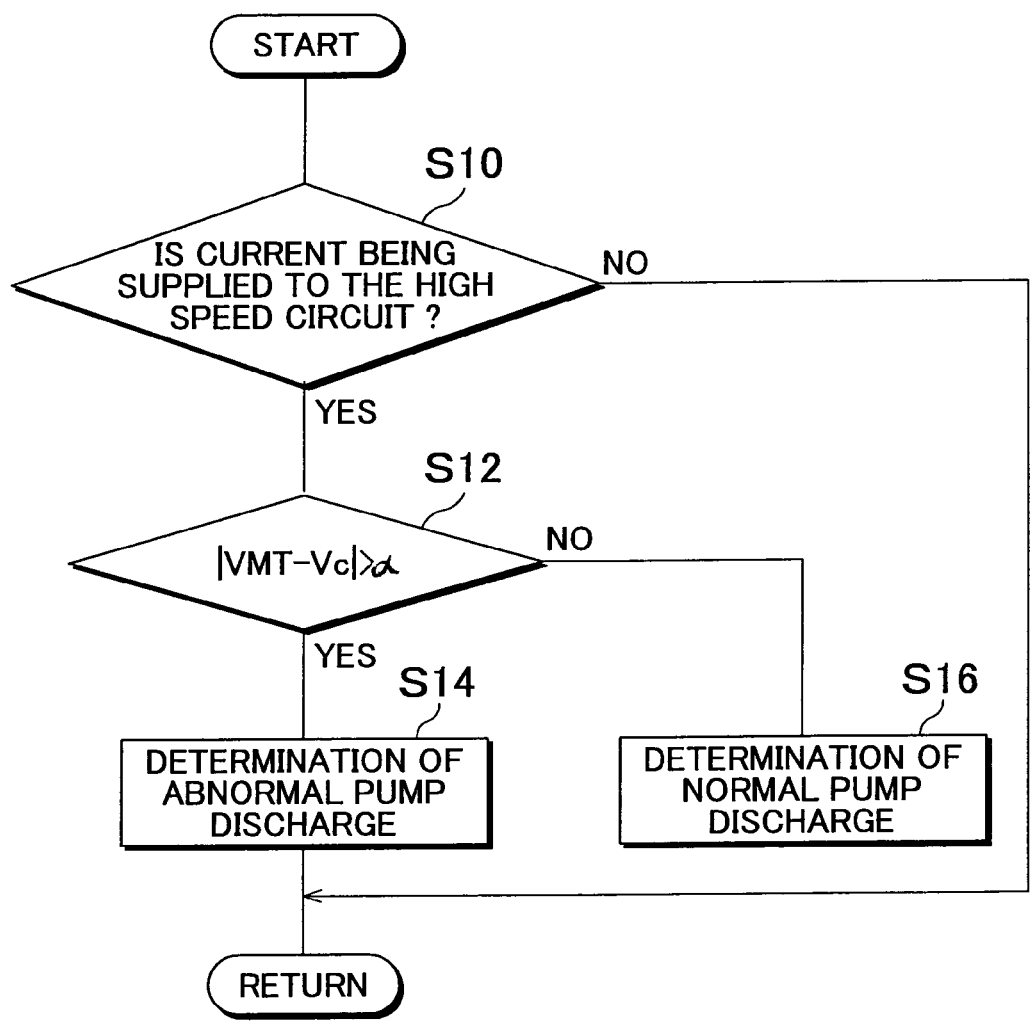
FIG. 6 is a flowchart illustrating a method for determining the pump discharge state by the pump control apparatus according to the first example embodiment.

FIG. 6 is a flowchart illustrating a method for determining the pump discharge state by the pump control apparatus 100 according to the first example embodiment. The routine shown in this flowchart is performed as necessary at a predetermined timing when the vehicle is being used.

First, the ECU 200 determines whether current is being supplied to the high speed circuit 130 (step S10). If the state of the switch 180 is such that the high speed circuit 130 is not connected to the battery 120 and thus current is not being supplied to the motor 32 via the high speed circuit 130 (i.e., No in step S10), this cycle of the routine ends.

If, on the other hand, the state of the switch 180 is such that the high speed circuit 130 is connected to the battery 120 and thus current is being supplied to the motor 32 via the high speed circuit 130 (i.e., Yes in step S10), the ECU 200 then obtains the power supply voltage Vc of the battery 120 and the output voltage VMT of the output terminal 170 and compares them (step S12). Because the rotation speed of the motor increases the lower the load on the motor 32 is, the value of the output voltage VL of the low speed circuit 140 increases due to the increase in induced electromotive force (see the white square in FIG. 5) and the value of the output voltage VMT of the output terminal 170 also increases. As a result, the difference between the power supply voltage Vc and the output voltage VMT increases (see the white diamond in FIG. 5).

Then, if $|VMT-Vc|>\alpha$ (where $\alpha$ is a predetermined threshold value) is satisfied (i.e., Yes in step S12), that is, if the difference between the output voltage VMT and the power supply voltage Vc is greater than the predetermined threshold value $\alpha$, the ECU 200 which functions as determining means determines that the load on the motor 32 has decreased and the discharge state of the oil pump 34 is abnormal (step S 14), and turns on an abnormal pump discharge flag. If, on the other hand, $|(VMT-Vc|>\alpha$ is not satisfied (i.e., No in step S12), then the ECU 200 determines that the load on the motor 32 has not significantly decreased and the discharge state of the oil pump is normal (step S16).

With the motor 32 described in the first example embodiment, the voltage output from the output terminal 170 and the low speed terminal 270 of the low speed circuit 140 may differ due to individual differences in the motor even if the load is the same. Therefore, a pump control apparatus according to a second example embodiment of the invention will be described which is capable of more accurately determining the motor load, and thus accurately determining the discharge state of the pump, by reducing the effect from individual differences in the motor. The basic structure of this pump control apparatus is similar to that of the pump control apparatus according to the first example embodiment described above so FIG. 2 will be referred to but a description of the structure will be omitted.

Figure 7:
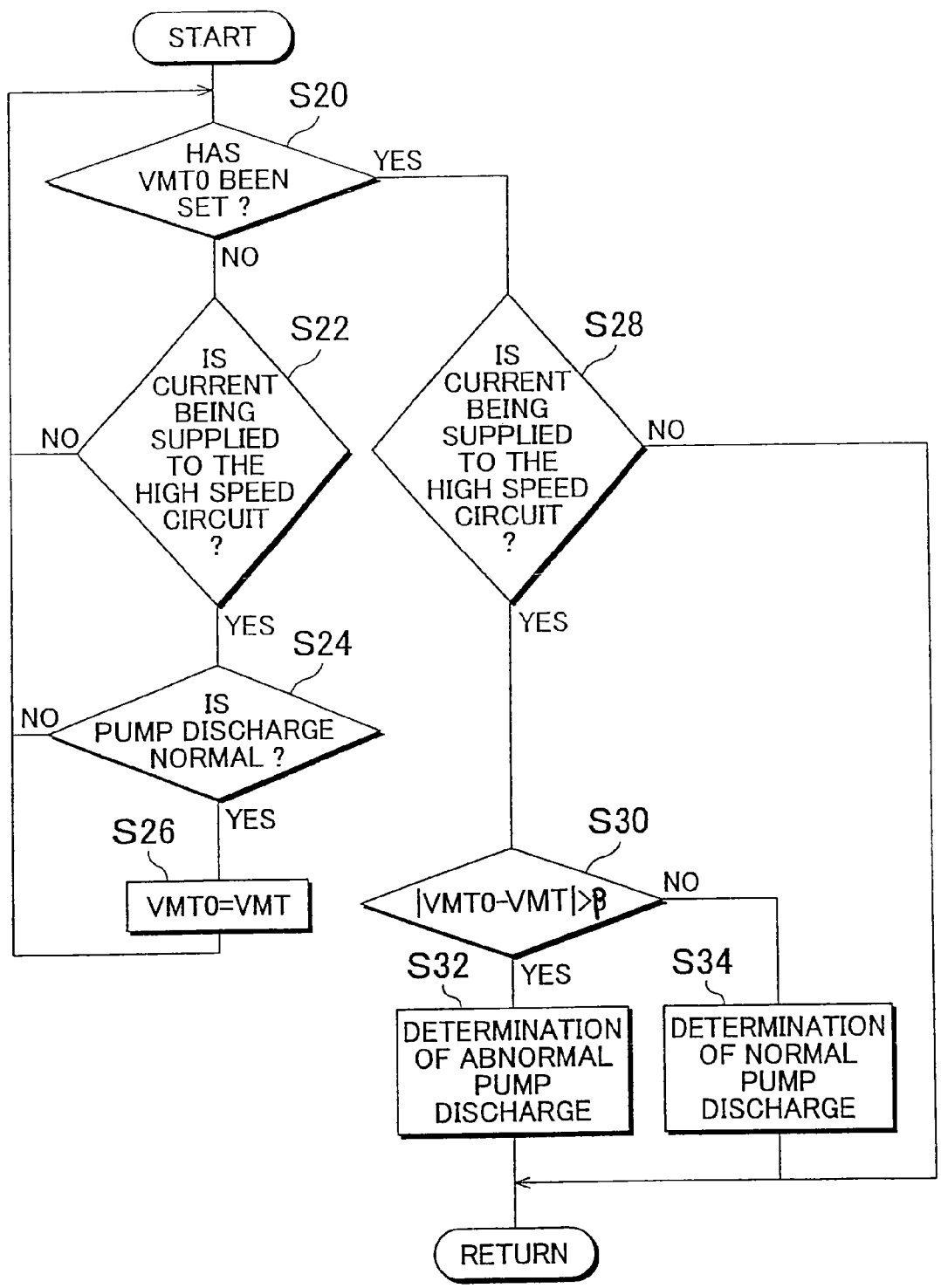
FIG. 7 is a flowchart illustrating a method for determining the pump discharge state using a reference output voltage by a pump control apparatus according to a second example embodiment of the invention.

FIG. 7 is a flowchart illustrating a method for determining the pump discharge state using a reference output voltage by the pump control apparatus 100 according to the second example embodiment. The routine shown in this flowchart is executed as necessary at a predetermined timing such as when a vehicle provided with a brake control system that includes the pump control apparatus is shipped from the factory and when the vehicle is started up.

First, the ECU 200 determines whether the reference output voltage VMT0 of the output terminal 170 when the discharge state of the oil pump 34 is normal has already been set (step S20). If the reference output voltage VMT0 has not already been set (i.e., No in step S20), then the ECU 200 determines whether current is being supplied to the high speed circuit 130 (step S22). If current is not being supplied to the high speed circuit 130 (i.e., No in step S22), the reference output voltage VMT0 cannot be set so the process returns to step S20. If, on the other hand, current is being supplied to the high speed circuit 130 (i.e., Yes in step S22), then the ECU 200 determines whether the discharge state of the oil pump 34 is normal (step S24). This determination may be made according to steps S12 to S16 in FIG. 6, for example.

If the discharge state of the oil pump 34 is not normal (i.e., No in step S24), the reference output voltage VMT0 cannot be set so the process returns to step S20. If, on the other hand, the discharge state of the oil pump 34 is normal (i.e., Yes in step S24), then the ECU 200 stores the output voltage VMT of the output terminal 170 as the reference output voltage VMT0 (step S26) after which the process returns to step S20.

Also, if the reference output voltage VMT0 has already been set in step S20 (i.e., Yes in step S20), the ECU 200 determines whether current is being supplied to the high speed circuit 130 (step S28). If current is not being supplied to the high speed circuit 130 (i.e., No in step S28), this cycle of the routine ends.

If, on the other hand, the high speed circuit 130 is connected to the battery 120 such that current is being supplied to the motor 32 via the high speed circuit 130 (i.e., Yes in step S28), the ECU 200 compares the stored reference output voltage VMT0 with the obtained output voltage VMT at the output terminal 170 (step S30). Because the rotation speed of the motor increases the lower the load on the motor 32 is, the value of the output voltage VL in the low speed circuit 140 at this time increases due to an increase in the induced electromotive force. As a result, the difference between the output voltage VMT at the output terminal 170 and the reference output voltage VMT0 increases.

Then, if $|VMT0-VMT|>\beta$ (where $\beta$ is a predetermined threshold value) is satisfied (i.e., Yes in step S30), that is, if the difference between the reference output voltage VMT0 detected when the discharge state of the pump is normal and the output voltage VMT is greater than the predetermined threshold value $\beta$, the ECU 200 which functions as determining means determines that the load on the motor 32 has decreased and the discharge state of the oil pump 34 is abnormal (step S32), and turns on an abnormal pump discharge flag. If, on the other hand, $|VMT0-VMT|>\beta$ is not satisfied (i.e., No in step S30), then the ECU 200 determines that the load on the motor 32 has not significantly decreased so the discharge state of the oil pump is normal (step S34). Accordingly, the state of the load on the motor can be determined while minimizing the effects from changes over time and individual differences in the motor 32.

With the motor 32 described in the second example embodiment, the voltage output from the output terminal 170 and the low speed terminal 270 of the low speed circuit 140 may differ due to the temperature even if the discharge state of the oil pump 34 is the same. Therefore, a pump control apparatus according to a third example embodiment of the invention will be described which is capable of more accurately determining the motor load, and thus accurately determining the discharge state of the pump, by reducing the effect from heat generated by the motor itself and the use environmental temperature. The basic structure of this pump control apparatus is similar to that of the pump control apparatus according to the first example embodiment described above so FIG. 2 will be referred to but a description of the structure will be omitted.

Figure 8:
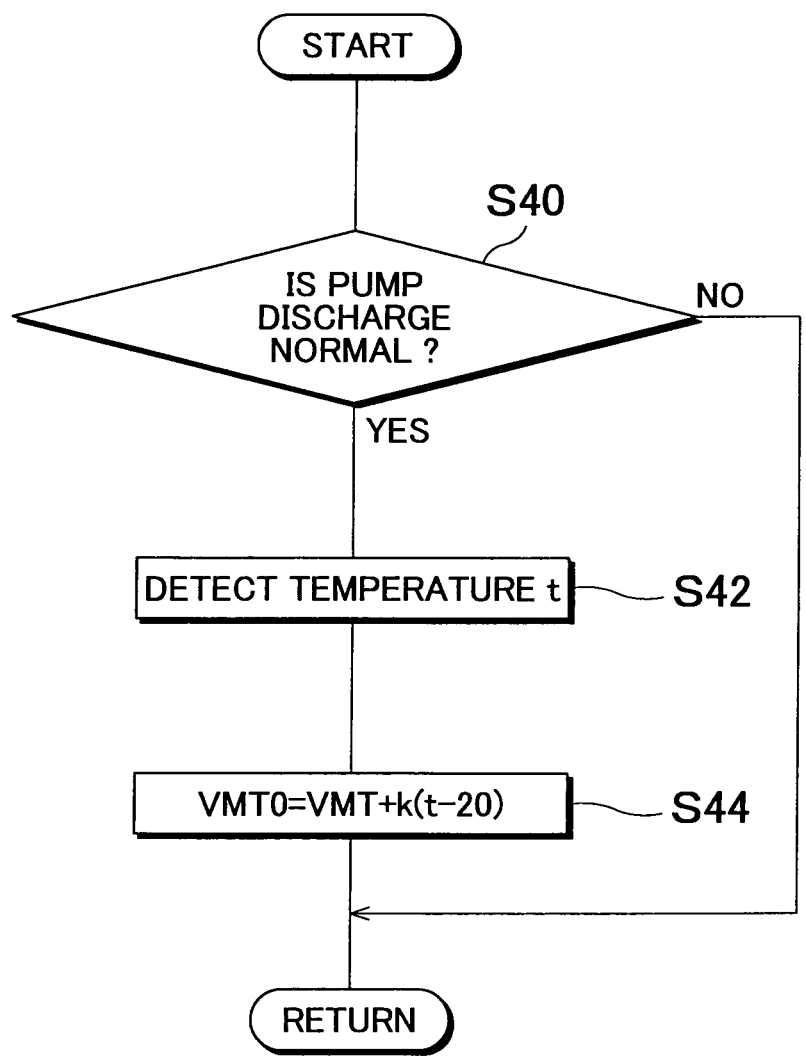
FIG. 8 is a flowchart illustrating a temperature-correction method for a reference output voltage of the pump control apparatus according to a third example embodiment of the invention.

The pump control apparatus 100 according to this example embodiment also includes the temperature sensor 62 (see FIG. 1) as temperature information detecting means for detecting temperature information that causes a change in the output voltage VMT at the output terminal 170. FIG. 8 is a flowchart illustrating a temperature-based correction method for a reference output voltage of the pump control apparatus 100 according to the third example embodiment. The routine shown in this flowchart is performed as necessary at a predetermined timing when the vehicle is being used.

First, the ECU 200 determines whether the discharge state of the oil pump 34 is normal (step S40). This determination may be made according to steps S12 to S16 in FIG. 6, for example. If the discharge state of the oil pump 34 is not normal (i.e., No in step S40), the reference output voltage VMT0 cannot be corrected based on the temperature so this cycle of the routine ends. If, on the other hand, the discharge state of the oil pump 34 is normal (i.e., Yes in step S40), the temperature t [° C.] of the motor is detected using the temperature sensor 62 (step S42).

Next, the ECU 200 obtains the output voltage VMT of the output terminal 170 adds a correction value k×(t−20) to that value, and stores the result as the reference output voltage VMT0 (step S44). Here, the term k is a coefficient that is obtained through testing or the like, and (t−20) is used because the reference temperature is set to 20[° C.].

As a result, the ECU 200 can determine the load state of the motor 32 using the reference output voltage VMT0 of the output terminal 170 that has been corrected based on the detected temperature. Accordingly, it is possible to accurately determine the load state of the motor, and thus accurately determine the discharge state of the pump, even if the environment in which the motor 32 is used changes.

Figure 9:
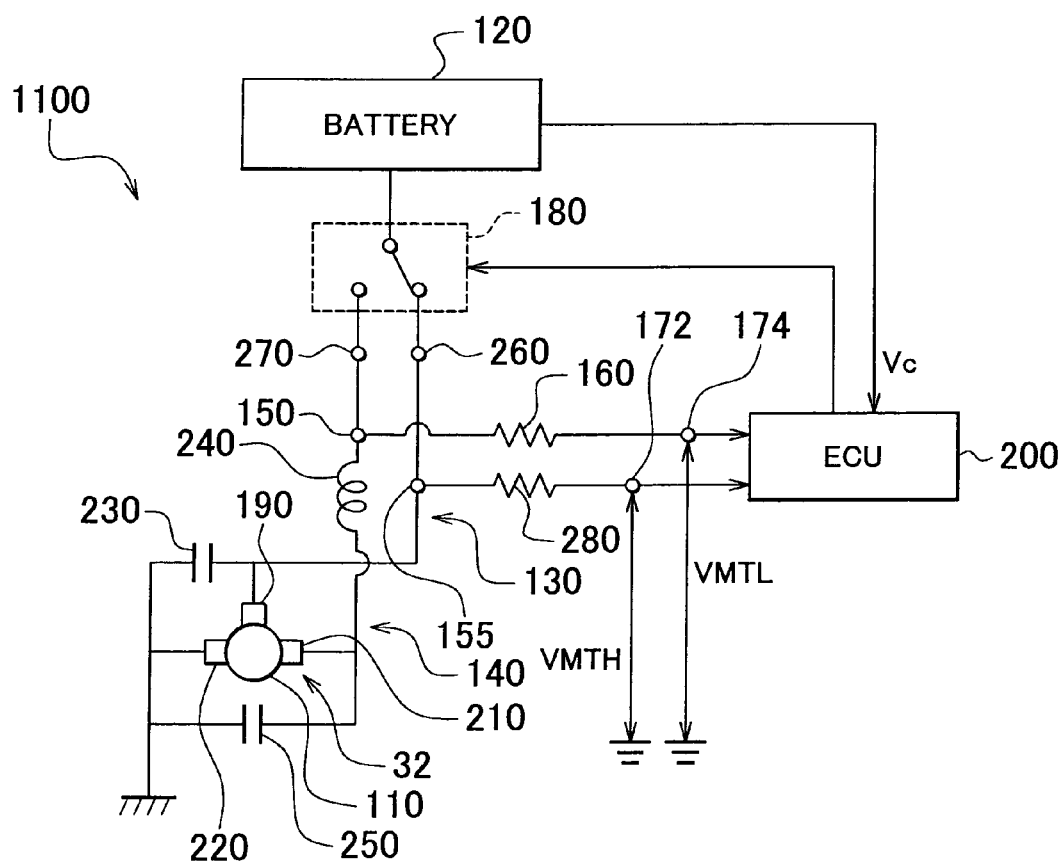
FIG. 9 is a diagram schematically showing the configuration of a pump control apparatus according to a fourth example embodiment of the invention.

A pump control apparatus according to a fourth example embodiment of the invention differs from the pump control apparatus 100 described above in that the high speed circuit 130 and the low speed circuit 140 are connected to separate output terminals. FIG. 9 is a diagram schematically showing the configuration of the pump control apparatus 1100 according to the fourth example embodiment.

As shown in FIG. 9, the pump control apparatus 1100 has two separate output terminals, i.e., an output terminal 172 that is connected to a branch point 155 of the high speed circuit 130 via a resistor 280, and an output terminal 174 that is connected to the branch point 150 of the low speed circuit 140 via the resistor 160. The output voltage VMTL output from the output terminal 174 is greater than the output voltage VMTH output from the output terminal 172 and the output voltage VMT output from the output terminal 170 of the pump control apparatus 100 shown in FIG. 2. Therefore, the ECU 200 can accurately determine the discharge state of the pump by using the output voltage VMTL, which is a larger value, when determining the pump discharge state as shown in FIGS. 6 and 7.

A control method of a brake control system 10 according to a fifth example embodiment of the invention, which is provided with the pump control apparatus described in the foregoing example embodiments, will now be described.

The brake control system 10 includes the reservoir tank 26, the master cylinder 14, a power hydraulic pressure source, the wheel cylinders 20FL and 20FR, the wheel cylinders 20RL and 20RR, the brake pressure control lines 16 and 18, the high pressure line 30, the pressure increase valves 40FL and 40FR, the pressure increase valves 40RL and 40RR, and the ECU 200. The reservoir tank 26 stores brake fluid. The master cylinder 14 pressurizes the stored brake fluid according to the operating amount of the brake pedal 12 by the driver. The power hydraulic pressure source can accumulate pressure using power independent of a brake operation by the driver. The wheel cylinders 20FL and 20FR receive a supply of brake fluid from at least one of the master cylinder 14 and the power hydraulic pressure source, and apply braking force to the front wheels. The wheel cylinders 20RL and 20RR receive a supply of brake fluid from at least one of the master cylinder 14 and the power hydraulic pressure source, and apply braking force to the rear wheels. The brake pressure control lines 16 and 18 connect the master cylinder 14 to the wheel cylinders 20FL and the 20FR, allowing brake fluid to be supplied from the master cylinder 14 to the wheel cylinders 20FL and 20FR. The high pressure line 30 connects the power hydraulic pressure source to the wheel cylinders 20FL and 20FR and the wheel cylinders 20RL and 20RR, allowing brake fluid to be supplied from the power hydraulic pressure source to the wheel cylinders 20FL and 20FR and the wheel cylinders 20RL and 20RR. The pressure increase valves 40FL and 40FR are provided in the high pressure line 30 and control the supply of brake fluid from the power hydraulic pressure source to the wheel cylinders 20FL and 20FR. The pressure increase valves 40RL and 40RR are also provided in the high pressure line 30 and control the supply of brake fluid from the power hydraulic pressure source to the wheel cylinders 20RL and 20RR. The ECU 200 controls the pressure increase valves 40FL, 40FR, 40RL, and 40RR in order to control the pressure of the brake fluid in the high pressure line 30.

The power hydraulic pressure source includes the oil pump 34 which is driven by the motor 32, the accumulator 50 which accumulates pressure by compressing a filler gas using the brake fluid supplied from the oil pump 34, and the pump control apparatus 100 that controls the discharge of the brake fluid using the rotation of the motor 32.

The pump control apparatus 100 is provided with determining means for determining the load state of the motor 32 based on the output voltage of the output terminal 170 (see FIG. 2) or the output terminal 174 (see FIG. 9). In this example embodiment, the ECU 200 also serves as this determining means. The ECU 200 estimates the remaining amount of brake fluid between the reservoir tank 26 and the oil pump 34 from the determined load state of the motor 32.

Accordingly, the brake control system 10 according to this example embodiment is able to accurately estimate the remaining amount of brake fluid by estimating the load on the oil pump 34 that changes according to the remaining amount of brake fluid by using the output voltage of the output terminal that is connected to the low speed circuit 140 of the motor 32 of the pump control apparatus 100. As a result, if the remaining amount of brake fluid is low, the brake fluid can be replenished or a warning indicating that the remaining amount of brake fluid is low can be output at an appropriate timing.

Figure 10:
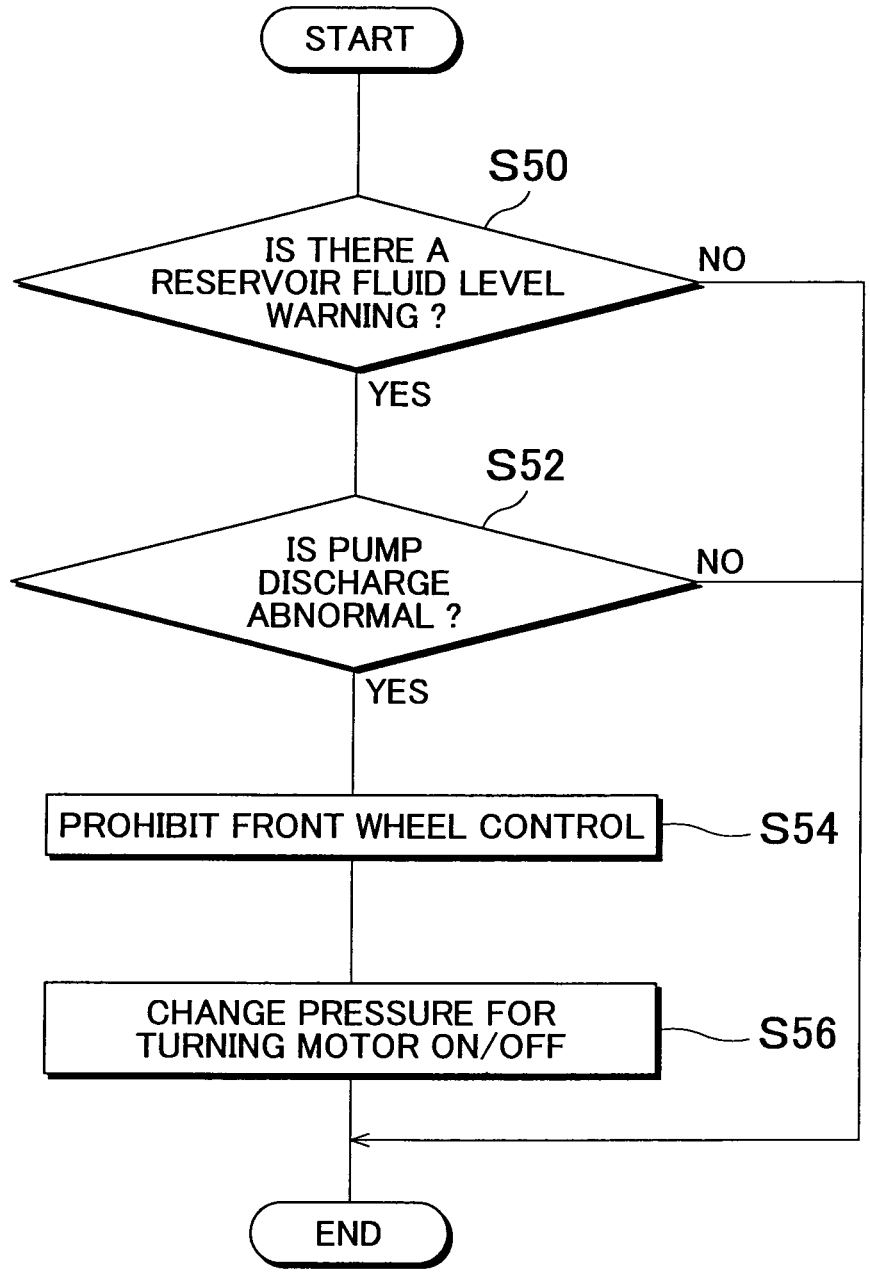
FIG. 10 is a flowchart illustrating a method for changing control when the brake fluid level is low by the brake control system according to a fifth example embodiment of the invention.

Next, a method for changing the control in the brake control system 10 using the estimation results for the remaining amount of brake fluid will be described. FIG. 10 is a flowchart illustrating a method for changing control when the brake fluid level is low by the brake control system 10 according to the fifth example embodiment.

First, the ECU 200 determines whether there is a sufficient amount of brake fluid remaining in the reservoir tank 26 according to whether a fluid level warning signal from a fluid level detecting sensor or the like provided in the reservoir tank 26 is detected (step S50). If the ECU 200 does not detect a fluid level warning signal (i.e., No in step S50), it means that there is a sufficient amount of brake fluid remaining in the reservoir tank 26 so there is no need to change the brake control by the brake control apparatus 10 and this cycle of the routine ends.

If, on the other hand, the ECU 200 detects a fluid level warning signal (i.e., Yes in step S50), it means that there is not a sufficient amount of brake fluid remaining in the reservoir tank 26. However, the line running from the reservoir tank 26 to the oil pump 34, the high pressure line 30, and the lines for returning brake fluid discharged from the pressure decrease valves 42FR to 42RL to the oil pump 34 and the like are full of brake fluid so even if there is an insufficient amount of brake fluid in the reservoir tank 26, normal brake control in the brake control system 10 may still be possible.

Therefore, the brake control system 10 according to this example embodiment changes the brake control method when the remaining amount of brake fluid has dropped to a level where the discharge state of the oil pump 34 becomes abnormal. More specifically, the ECU 200 determines whether the discharge of the oil pump 34 is abnormal according to the method shown in FIG. 6 or 7 (step S52). If the discharge of the oil pump 34 is not abnormal (i.e., No in step S52), it is not necessary to change the brake control by the brake control system 10 so this cycle of the routine ends.

However, if the remaining amount of brake fluid estimated from the load on the oil pump 34 is equal to or less than a predetermined threshold value, the ECU 200 determines that the pump discharge is abnormal (i.e., Yes in step S52). In this case, the ECU 200 closes the pressure increase valves 40FL and 40FR to interrupt the supply of brake fluid from the accumulator 50 to the front-wheel wheel cylinders 20FL and 20FR (step S54). Accordingly, if there is a brake request when the remaining amount of brake fluid is equal to or less than the predetermined threshold, the brake control system 10 is able to apply sufficient braking force to the rear-wheel wheel cylinders 20RL and 20RR, even if the amount of brake fluid is low, by interrupting the supply of brake fluid from the accumulator 50 to the front-wheel wheel cylinders 20FL and 20FR. At this time, the brake control system 10 is also able to supply brake fluid to the front-wheel wheel cylinders 20FL and 20FR by opening the right electromagnetic switching valve 22FR and the left electromagnetic switching valve 22FL. As a result, the necessary braking force can be generated in all of the wheel cylinders 20. Therefore, even if there is an insufficient amount of brake fluid in the reservoir tank 26, all four wheel can be braked by using brake fluid fed to the front wheels from the master cylinder 14 using the depression force applied by the driver, and brake fluid fed to the rear wheels from the accumulator.

Furthermore, the brake control system 10 changes the set value of the accumulator pressure for starting and stopping the motor 32 by monitoring the accumulator pressure detected by the accumulator pressure sensor 51 (step S56). More specifically, the accumulator pressure $PACC_{ON}$ when the motor 32 is started (i.e., turned on) is changed to $PACC_{ON}-P1$ (where P1 is a predetermined positive value), and the accumulator pressure $PACC_{OFF}$ when the motor 32 is stopped (i.e., turned off) is changed to $PACC_{OFF}-P2$ (where P2 is a predetermined positive value). As a result, the motor 32 is turned on and off at a lower pressure than before so even if the discharge of the oil pump 34 is not normal due to a decrease in brake fluid, it is still possible to inhibit air from being sucked into the oil pump 34. Also, the motor 32 is prevented from being driven at a low load for extended periods of time, which keeps the motor 32 from overheating.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

The invention claimed is:

1. A pump control apparatus which controls discharge of brake fluid using rotation of a motor comprising:
   a motor main body including a rotating shaft that drives a pump;
   a high speed circuit configured to operate the motor at a first rotation speed when the high speed circuit is connected to a power supply;
   a low speed circuit configured to operate the motor at a second rotation speed which is slower than the first rotation speed when the low speed circuit is connected to the power supply while a voltage in the low speed circuit becomes higher than a power supply voltage when the power supply is connected to the high speed circuit;
   a switch connected between the power supply and the high speed circuit, and connected between the power supply and the low speed circuit;
   an output terminal which is connected to a first branch point via a first resistor, the first branch point being disposed in the low speed circuit between the motor main body and the switch, and which is connected to a second branch point via a second resistor, the second branch point being disposed in the high speed circuit between the motor main body and the switch;
   a temperature sensor that detects a temperature of the motor; and
   a controller determines a load state of the motor based on a first output voltage at the output terminal, and, if a first discharge state of the pump is normal, the controller determines a corrected first output voltage based on the first output voltage at the terminal and the temperature of the motor detected by the temperature sensor, and determines the load state of the motor based on the corrected first output voltage,
   wherein a value of the first resistor arranged between the output terminal and the low speed circuit is lower than a value of the second resistor arranged between the output terminal and the high speed circuit.

2. The pump control apparatus according to claim 1, wherein:
   a number of windings in the low speed circuit is set such that the motor operates at the second rotation speed when the low speed circuit is connected to the power supply; and
   the high speed circuit is configured to share a portion of the number of windings in the low speed circuit so that the motor operates at the first rotation speed when the power supply voltage is input to an input terminal which is disposed midway in the number of windings in the low speed circuit.

3. The pump control apparatus according to claim 1, wherein before determining the corrected first output voltage, the controller determines the load state of the motor based on a difference between the first output voltage at the output terminal and the power supply voltage.

4. The pump control apparatus according to claim 3, wherein the controller determines that the load state of the motor is decreased and the first discharge state of the pump is abnormal when the difference between the first output voltage at the output terminal and the power supply voltage is greater than a first threshold value.

5. The pump control apparatus according to claim 1, wherein before determining the corrected first output voltage, the controller determines the load state of the motor based on a difference between the first output voltage at the output terminal and the power supply voltage when the high speed circuit is connected to the power supply.

6. The pump control apparatus according to claim 5, the controller determines a second discharge state of the pump based on the corrected first output voltage and a second output voltage at the output terminal.

7. A brake control system comprising:
   a reservoir that stores brake fluid;
   a manual hydraulic pressure source that pressurizes the stored brake fluid according to an operating amount of a brake operating member by a driver;
   a power hydraulic pressure source that accumulates pressure using power independent of a brake operation by the driver;
   a first wheel cylinder which receives brake fluid from at least one of the manual hydraulic pressure source and the power hydraulic pressure source, and applies braking force to a first wheel;
   a second wheel cylinder which receives brake fluid from the power hydraulic pressure source, and applies braking force to a second wheel;
   a manual pressure transmitting path which connects the manual hydraulic pressure source with the first wheel cylinder such that the brake fluid is supplied from the manual hydraulic pressure source to the first wheel cylinder;
   a power hydraulic pressure transmitting path which connects the power hydraulic pressure source with the first wheel cylinder and the second wheel cylinder such that the brake fluid is supplied from the power hydraulic pressure source to the first wheel cylinder and the second wheel cylinder;
   a first control valve which is provided in the power hydraulic pressure transmitting path, and controls the supply of brake fluid from the power hydraulic pressure source to the first wheel cylinder;

a second control valve which is provided in the power hydraulic pressure transmitting path, and controls the supply of brake fluid from the power hydraulic pressure source to the second wheel cylinder; and a valve controller that controls the first control valve and the second control valve to control the pressure of the brake fluid in the power hydraulic pressure transmitting path, wherein the power hydraulic pressure source includes a pump that is driven by a motor, an accumulator in which pressure is accumulated by filler gas being compressed by the brake fluid supplied from the pump, and a pump control apparatus that controls discharge of brake fluid using rotation of the motor;

the pump control apparatus includes:

a motor main body including a rotating shaft that drives the pump, a high speed circuit configured to operate the motor at a first rotation speed when the high speed circuit is connected to a power supply, a low speed circuit configured to operate the motor at a second rotation speed which is slower than the first rotation speed when the low speed circuit is connected to the power supply while a voltage in the low speed circuit becomes higher than a power supply voltage when the power supply is connected to the high speed circuit, a switch connected between the power supply and the high speed circuit, and connected between the power supply and the low speed circuit, an output terminal which is connected to a first branch point via a first resistor, the first branch point being disposed in the low speed circuit between the motor main body and the switch, and the first branch point is connected to a second branch point via a second resistor, the second branch point being disposed in the high speed circuit between the motor main body and the switch, a temperature sensor that detects a temperature of the motor, and a controller determines a load state of the motor based on a first output voltage at the output terminal, and, if a first discharge state of the pump is normal, the controller determines a corrected first output voltage based on the first output voltage at the terminal and the temperature of the motor detected by the temperature sensor, and determines the load state of the motor based on the corrected first output voltage, and the controller estimates a remaining amount of brake fluid between the reservoir and the pump from the load state of the motor.

8. The brake control system according to claim 7, wherein the valve controller closes the first control valve to interrupt the supply of brake fluid from the accumulator to the first wheel cylinder when the remaining amount of brake fluid estimated by the controller is equal to or less than a predetermined value.

9. The pump control apparatus according to claim 1, wherein the controller determines a second discharge state of the pump based on the corrected first output voltage of the output terminal and a second output voltage at the output terminal.

10. The pump control apparatus according to claim 6, wherein the controller determines that the first discharge state of the pump is normal when the difference between the first output voltage at the output terminal and the power supply voltage is less than a first threshold value, and the controller determines the second pump discharge state is abnormal when a difference between the second output voltage at the output terminal and the corrected first output voltage is greater than a second threshold value.

11. The pump control apparatus according to claim 9, wherein the first output voltage at the terminal is based on a first voltage in the low speed circuit when the power supply is connected to the high speed circuit, and the second output voltage at the terminal is based on a second voltage in the low speed circuit when the power supply is connected to the high speed circuit.

12. The pump control apparatus according to claim 7, wherein the controller determines a second discharge state of the pump based on the corrected first output voltage and a second output voltage at the output terminal.

13. The brake control system according to claim 12, wherein the first output voltage at the terminal is based on a first voltage in the low speed circuit when the power supply is connected to the high speed circuit, and the second output voltage at the terminal is based on a second voltage in the low speed circuit when the power supply is connected to the high speed circuit.

14. A pump control apparatus which controls discharge of brake fluid using rotation of a motor comprising:

a motor main body including a rotating shaft that drives a pump;

a high speed circuit configured to operate the motor at a first rotation speed when the high speed circuit is connected to a power supply;

a low speed circuit configured to operate the motor at a second rotation speed which is slower than the first rotation speed when the low speed circuit is connected to the power supply while a voltage in the low speed circuit becomes higher than a power supply voltage when the power supply is connected to the high speed circuit;

a switch connected between the power supply and the high speed circuit, and connected between the power supply circuit and the low speed circuit;

an output terminal which is connected to a first branch point via a first resistor, the first branch point being disposed in the low speed circuit between the motor main body and the switch, and which is connected to a second branch point via a second resistor, the second branch point being disposed in the high speed circuit between the motor main body and the switch, a value of the first resistor arranged between the output terminal and the low speed circuit is lower than a value of the second resistor arranged between the output terminal and the high speed circuit; and a controller that determines a load state of the motor based on an output voltage at the output terminal.

15. A brake control system comprising:

a reservoir that stores brake fluid;

a manual hydraulic pressure source that pressurizes the stored brake fluid according to an operating amount of a brake operating member by a driver;

a power hydraulic pressure source that accumulates pressure using power independent of a brake operation by the driver;

a first wheel cylinder which receives brake fluid from at least one of the manual hydraulic pressure source and the power hydraulic pressure source, and applies braking force to a first wheel;

a second wheel cylinder which receives brake fluid from the power hydraulic pressure source, and applies braking force to a second wheel;

a manual pressure transmitting path which connects the manual hydraulic pressure source with the first wheel cylinder such that the brake fluid is supplied from the manual hydraulic pressure source to the first wheel cylinder;

a power hydraulic pressure transmitting path which connects the power hydraulic pressure source with the first wheel cylinder and the second wheel cylinder such that the brake fluid is supplied from the power hydraulic pressure source to the first wheel cylinder and the second wheel cylinder;

a first control valve which is provided in the power hydraulic pressure transmitting path, and controls the supply of brake fluid from the power hydraulic pressure source to the first wheel cylinder;

a second control valve which is provided in the power hydraulic pressure transmitting path, and controls the supply of brake fluid from the power hydraulic pressure source to the second wheel cylinder; and a valve controller that controls the first control valve and the second control valve to control the pressure of the brake fluid in the power hydraulic pressure transmitting path, wherein the power hydraulic pressure source includes a pump that is driven by a motor, an accumulator in which pressure is accumulated by filler gas being compressed by the brake fluid supplied from the pump, and a pump control apparatus that controls discharge of brake fluid using rotation of the motor;

the pump control apparatus includes:

a motor main body including a rotating shaft that drives the pump, a high speed circuit configured to operate the motor at a first rotation speed when the high speed circuit is connected to a power supply, a low speed circuit configured to operate the motor at a second rotation speed which is slower than the first rotation speed when the low speed circuit is connected to the power supply while a voltage in the low speed circuit becomes higher than a power supply voltage when the power supply is connected to the high speed circuit, a switch connected between the power supply and the high speed circuit, and connected between the power supply circuit and the low speed circuit, an output terminal which is connected to a first branch point via a first resistor, the first branch point being disposed in the low speed circuit between the motor main body and the switch, and the first branch point is connected to a second branch point via a second resistor, the second branch point being disposed in the high speed circuit between the motor main body and the switch, a value of the first resistor arranged between the output terminal and the low speed circuit is lower than a value of the second resistor arranged between the output terminal and the high speed circuit, and a controller that determines a load state of the motor based on an output voltage at the output terminal, and the controller estimates a remaining amount of brake fluid between the reservoir and the pump from the load state of the motor.

* * * * *